United States Patent
Lee

(10) Patent No.: US 7,066,486 B2
(45) Date of Patent: Jun. 27, 2006

(54) PASSENGER AIR BAG SYSTEM FOR VEHICLES

(75) Inventor: Jung Su Lee, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 264 days.

(21) Appl. No.: 10/702,468

(22) Filed: Nov. 7, 2003

(65) Prior Publication Data

US 2005/0082793 A1     Apr. 21, 2005

(30) Foreign Application Priority Data

Oct. 17, 2003     (KR) ...................... 10-2003-0072616

(51) Int. Cl.
*B60R 21/16*     (2006.01)

(52) U.S. Cl. .................... 280/728.2; 280/732; 280/740
(58) Field of Classification Search ............. 280/728.1, 280/728.2, 732, 736, 740, 742; B60R 21/16, B60R 21/26
See application file for complete search history.

(56) References Cited

U.S. PATENT DOCUMENTS

| 5,462,305 | A | * | 10/1995 | Hamada ................... 280/728.2 |
| 5,788,267 | A | * | 8/1998 | Lotspih et al. ........... 280/728.2 |
| 5,788,269 | A | * | 8/1998 | Jakovski et al. ......... 280/728.2 |
| 6,394,486 | B1 | * | 5/2002 | Fujimura et al. ........ 280/728.2 |
| 6,435,548 | B1 | * | 8/2002 | Suzuki et al. ............... 280/732 |
| 2002/0043787 | A1 | * | 4/2002 | Yokoyama ............... 280/728.2 |

* cited by examiner

*Primary Examiner*—Paul N. Dickson
*Assistant Examiner*—Tiffany Webb
(74) *Attorney, Agent, or Firm*—Greenblum & Bernstein, P.L.C.

(57) ABSTRACT

A passenger air bag system for vehicles includes an air bag housing, an inflator disposed in the air bag housing for discharging gas when a collision of the vehicle occurs, a cushion accommodated in the air bag housing such that the cushion is expanded by means of the gas discharged from the inflator, a retainer disposed between the cushion and the inflator for supporting the cushion, and an inflator holder disposed between the retainer and the inflator. The retainer has a plurality of gas-guiding holes for guiding the gas discharged from the inflator to the cushion. The inflator holder is fixed to the air bag housing together with the retainer for securely holding the inflator by means of a fixing force of the retainer.

19 Claims, 5 Drawing Sheets

PASSENGER AIR BAG SYSTEM FOR VEHICLES

RELATED APPLICATIONS

The present disclosure relates to subject matter contained in Korean Application No. 10-2003-72616, filed on Oct. 17, 2003, which is herein expressly incorporated by reference in its entirety.

BACKGROUND OF THE INVENTION

1. Field of the Invention

The present invention relates to an air bag system for vehicles, and more particularly to a passenger air bag system for vehicles, wherein the installation structure of an inflator is improved so that the assembly efficiency of the air bag system is increased, and the size of the air bag system is reduced so that compact design of the air bag system is possible.

2. Description of the Related Art

Generally, an air bag system for vehicles is mounted in front of a driver seat or a passenger seat in such a manner that a cushion of the air bag system is instantly expanded when a collision of the vehicle occurs for protecting a driver or a passenger from injury.

The air bag systems may be classified into a driver air bag system and a passenger air bag system. The driver air bag system is mounted to the steering wheel of the vehicle for protecting the driver from injury. The passenger air bag system is mounted to an instrument panel of the vehicle disposed in front of the passenger seat for protecting the passenger from injury. Basically, the driver air bag system is requisite, and the passenger air bag system is optional; however, vehicles with passenger air bag systems basically mounted therein for protecting passengers from injury are on the increase in recent years.

FIG. 1 is an exploded perspective view showing a conventional passenger air bag system, and FIG. 2 is a longitudinal sectional view showing the conventional passenger air bag system.

As shown in FIGS. 1 and 2, the conventional passenger air bag system for vehicles comprises: an air bag housing 4 mounted to an instrument panel 2; an inflator 6 mounted in the air bag housing 4 for discharging gas when a collision of the vehicle occurs; a cushion 8 accommodated in the air bag housing 4 such that the cushion 8 is expanded to the front of a passenger seat by means of gas discharged from the inflator 6; and a retainer 10 attached to the air bag housing 4 for supporting the cushion 8, the retainer 10 having a plurality of gas-guiding holes 10a for guiding gas discharged from the inflator 6 to the cushion 8.

The air bag housing 4 comprises: a cushion housing 12 formed in the shape of a box with the front part opened so that the cushion 8 is accommodated in the cushion housing 12 while being folded; and a can housing 14 connected to the rear part of the cushion housing 12, in which the inflator 6 is disposed.

The cushion housing 12 is provided along both longitudinal sides at the front part thereof with flanges 12a, respectively, which are fixed to the rear part of the instrument panel 2 by means of bolts. At the instrument panel 2 is formed a cut line 2a so that the instrument panel 2 is easily and smoothly broken along the cut line 2a by means of the expanding pressure of the cushion 8.

The can housing 14 is connected to the rear part of the cushion housing 12 in such a manner that the can housing 14 communicates with the cushion housing 12. The can housing 14 is fixed to a cowl cross member (not shown) disposed in the instrument panel 2 by means of a mounting bracket (not shown).

The inflator 6 is formed in the shape of a cylinder. The inflator 6 is provided on the outer circumference at one side thereof with a plurality of gas-discharging holes 16 for discharging gas when a collision of the vehicle occurs.

At one end of the inflator 6 is formed a fixing protrusion 18 having a male screw thread part formed on the outer circumference thereof, on which a fixing nut 20 is rotatably fitted so that the inflator 6 is attached to the side of the can housing 14. At the other end of the inflator 6 is formed a connector-connecting member 22 in such a manner that the connector-connecting member 22 is protruded outwardly. To the inflator 6 is fixed a connector 24, by which the inflator 6 is linked to an external device, through the connector-connecting member 22.

The inflator 6 is horizontally disposed in the can housing 14. At one end of the inflator 6 is formed a fixing protrusion 18, which is inserted through a through-hole 26 formed at one end of the can housing 14. The other end of the inflator 6 is inserted through an opening 28 formed at the other end of the can housing 14.

The retainer 10 is attached to the can housing 14 together with the cushion 8 by means of bolts such that the plurality of gas-guiding holes 10a formed at the center of the retainer 10 communicate with an inlet part of the cushion 8. The retainer 10 serves to support the cushion 8 so that the cushion 8 is not separated from the can housing 14 due to the pressure of the gas when the cushion 8 is expanded.

The operation of the conventional passenger air bag system with the above-stated construction will now be described. When a collision of the vehicle occurs, an operation signal is transmitted from an electronic control unit to the inflator 6 via the connecter 24, and then the inflator 6 is exploded by means of electric current from a power supply terminal for discharging gas through the gas-discharging holes 16.

The gas discharged from the inflator 6 flows along the can housing 14 so that the gas is supplied into the cushion 8 through the gas-guiding holes 10a of the retainer 10. The cushion 8 is expanded to the front of the cushion housing 12 by means of the gas supplied into the cushion 8.

The instrument panel 2 is broken along the cut line 2a formed at the instrument panel 2 by means of the cushion 8 expanded as described above. Subsequently, the cushion 8 is further expanded toward a passenger seated in the passenger seat, whereby shock transmitted to the passenger is effectively absorbed, and thus injury to the passenger is minimized.

In the conventional passenger air bag system for vehicles, however, the fixing protrusion 18 of the inflator 6 is securely fixed to a fixing part 30, which is formed by one end of the can housing 14, by means of the fixing nut 20. In other words, an additional fixing operation carried out by means of the fixing nut 20 is required when the inflator 6 is assembled. Consequently, the assembly efficiency of the inflator is deteriorated. Furthermore, it is difficult and troublesome to continuously or periodically maintain the fixing protrusion 18 and the fixing nut 20.

Torque control of the fixing protrusion 18 and the fixing nut 20 is required so that the fixing nut 20 is securely fitted on the fixing protrusion 18 while there is provided an appropriate fixing force between the fixing protrusion 18 and the fixing nut 20 on the basis of the explosive power of the inflator 6 and the structure of the air bag housing 4. Also, record control of the fixing protrusion 18 and the fixing nut 20 is required, which is performed by marking a fixing force between the fixing protrusion 18 and the fixing nut 20 at one side thereof for further reference.

SUMMARY OF THE INVENTION

Therefore, the present invention has been made in view of the above problems, and it is an object of the present invention to provide a passenger air bag system for vehicles wherein an inflator is fixed using an inflator holder pressed by an air bag housing and a retainer, whereby no fixing nut is necessary when the inflator is assembled, the assembly operation is simplified, the assembly efficiency is improved, and the size of the air bag housing is reduced.

In accordance with the present invention, the above and other objects can be accomplished by the provision of a passenger air bag system for vehicles, comprising: an air bag housing; an inflator disposed in the air bag housing for discharging gas when a collision of the vehicle occurs; a cushion accommodated in the air bag housing such that the cushion is expanded by means of the gas discharged from the inflator; a retainer disposed between the cushion and the inflator for supporting the cushion, the retainer having a plurality of gas-guiding holes for guiding the gas discharged from the inflator to the cushion; and an inflator holder disposed between the retainer and the inflator, the inflator holder being fixed to the air bag housing together with the retainer for securely holding the inflator by means of a fixing force of the retainer.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the accompanying drawings.

Figure 1:
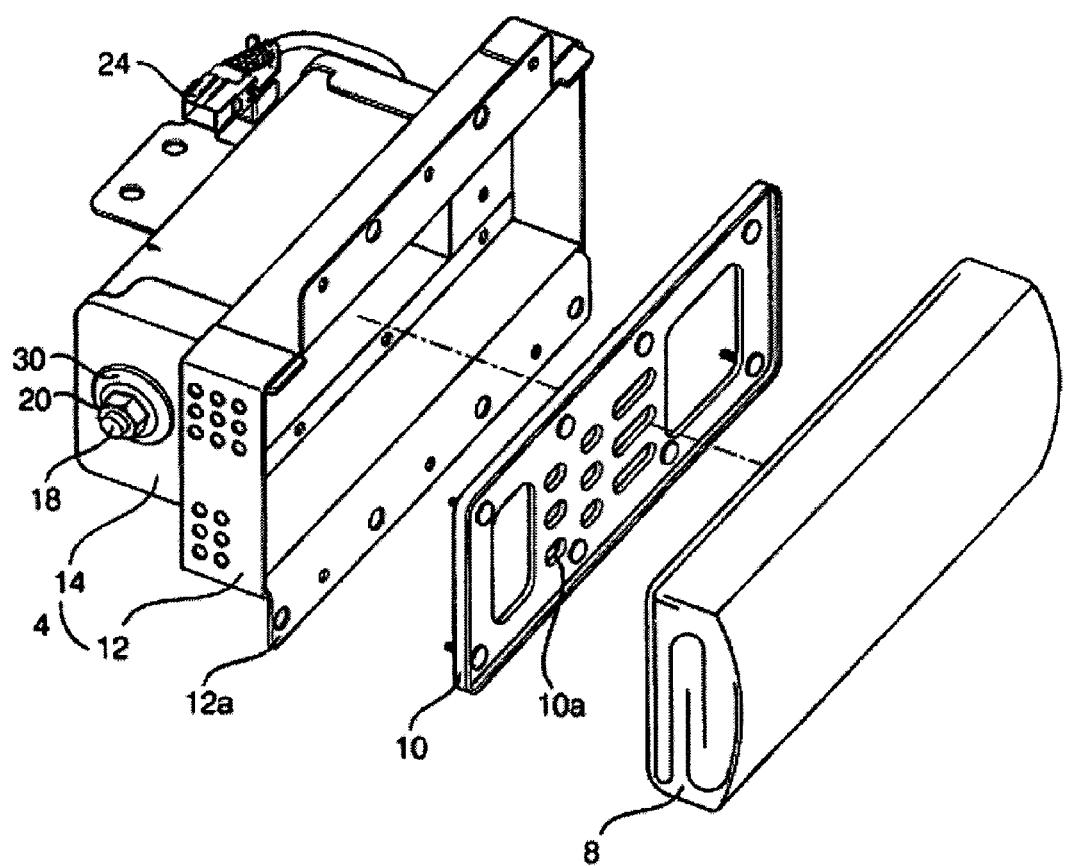
FIG. 1 is an exploded perspective view showing a conventional passenger air bag system.
Figure 2:
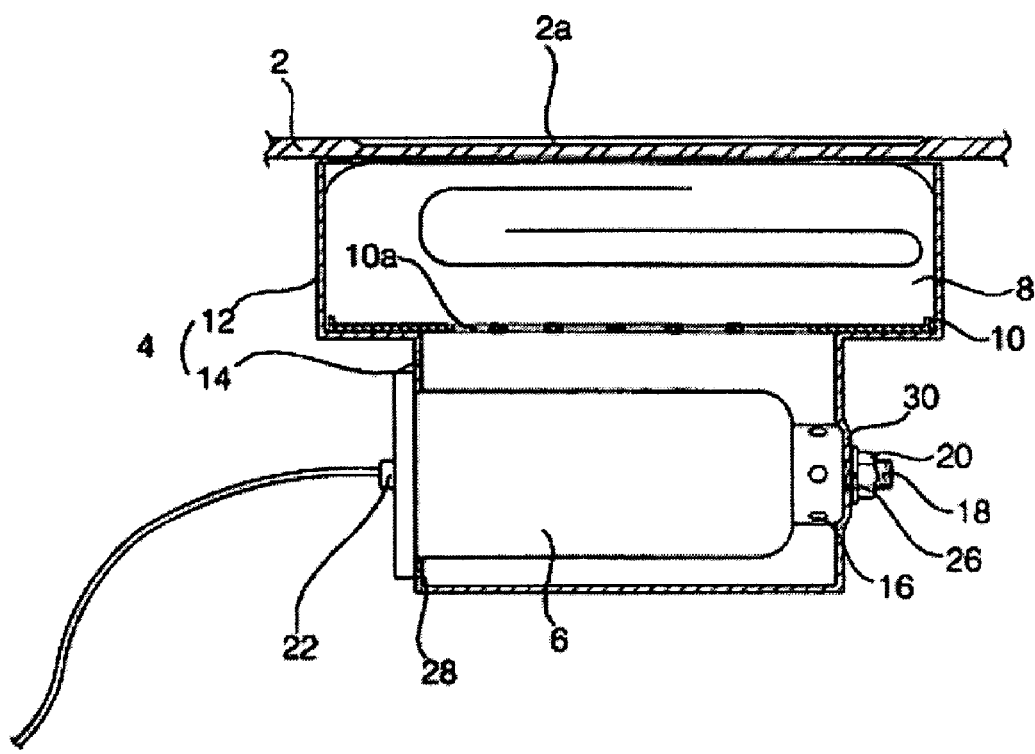
FIG. 2 is a longitudinal sectional view showing the conventional passenger air bag system.
Figure 3:
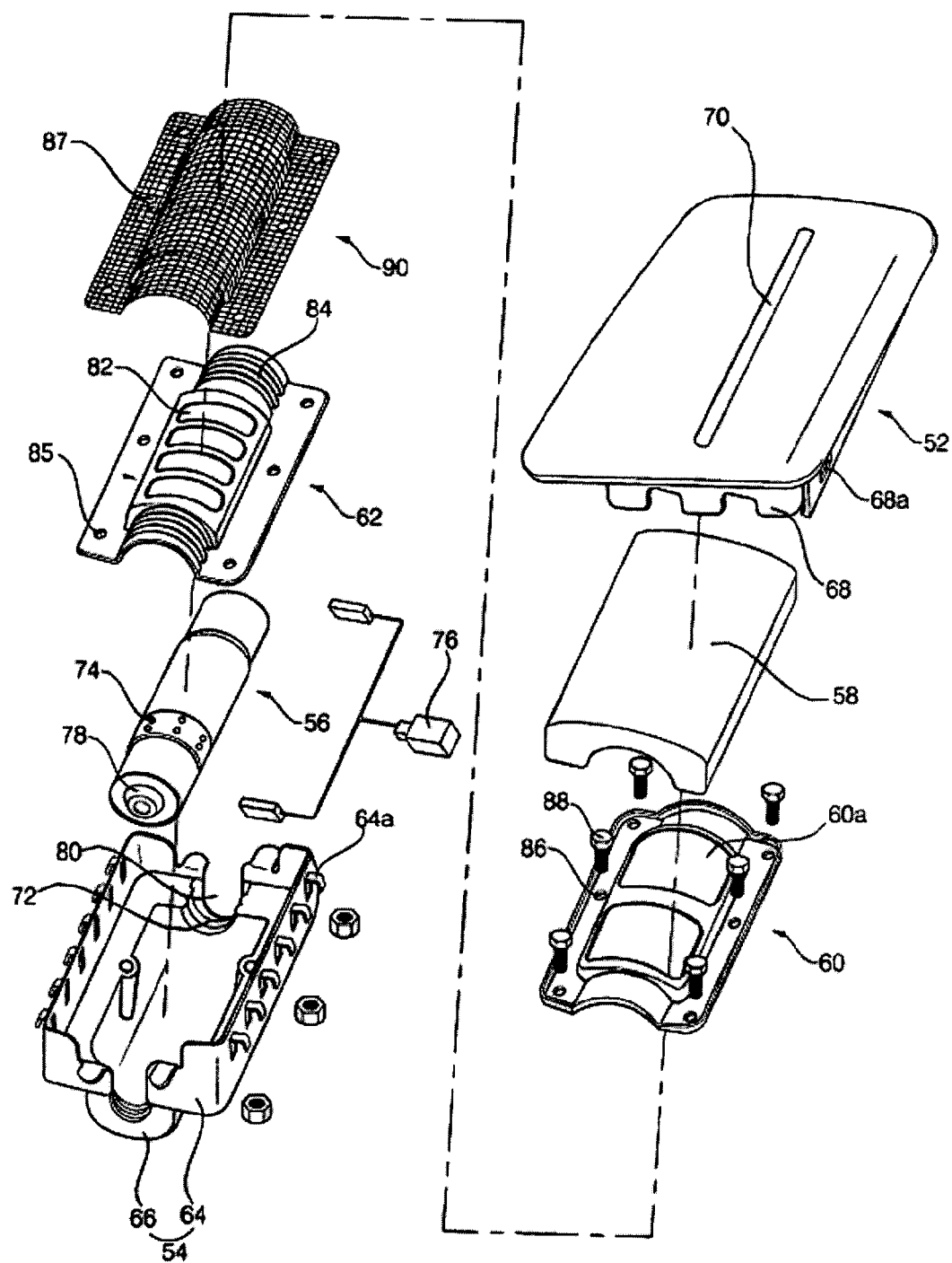
FIG. 3 is an exploded perspective view showing a passenger air bag system according to a preferred embodiment of the present invention.
Figure 4:
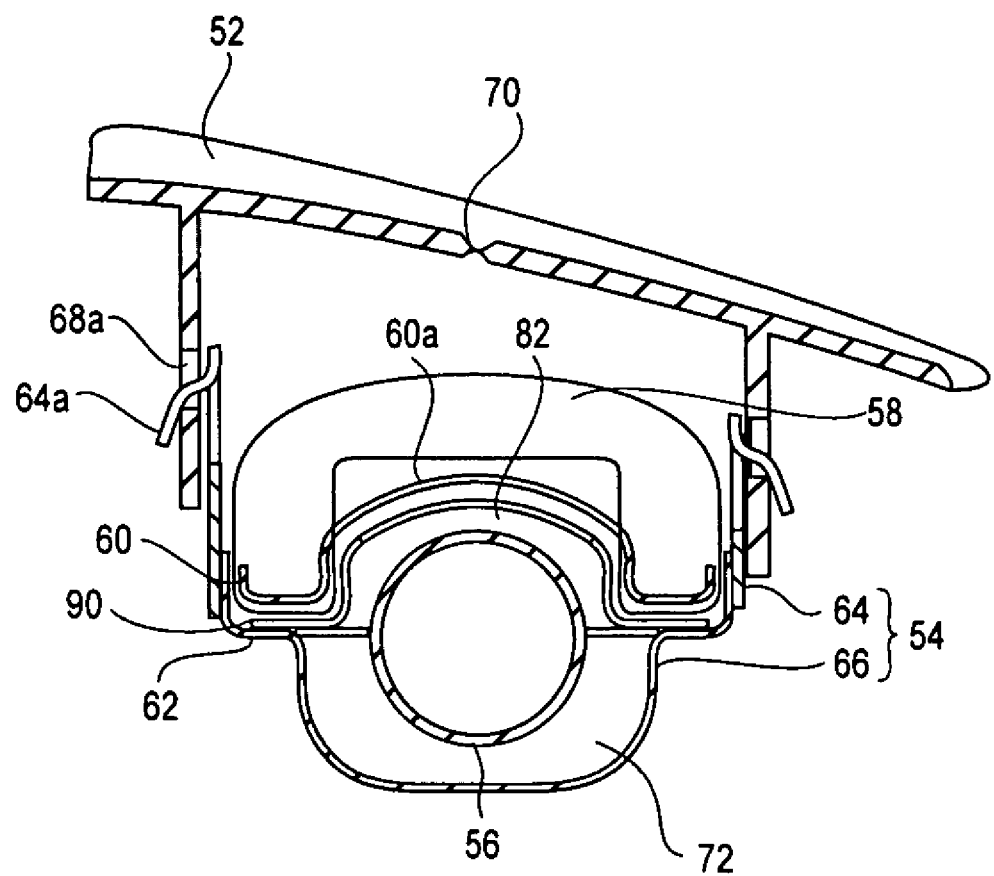
FIG. 4 is a side view, in section, showing the passenger air bag system according to the preferred embodiment of the present invention.
Figure 5:
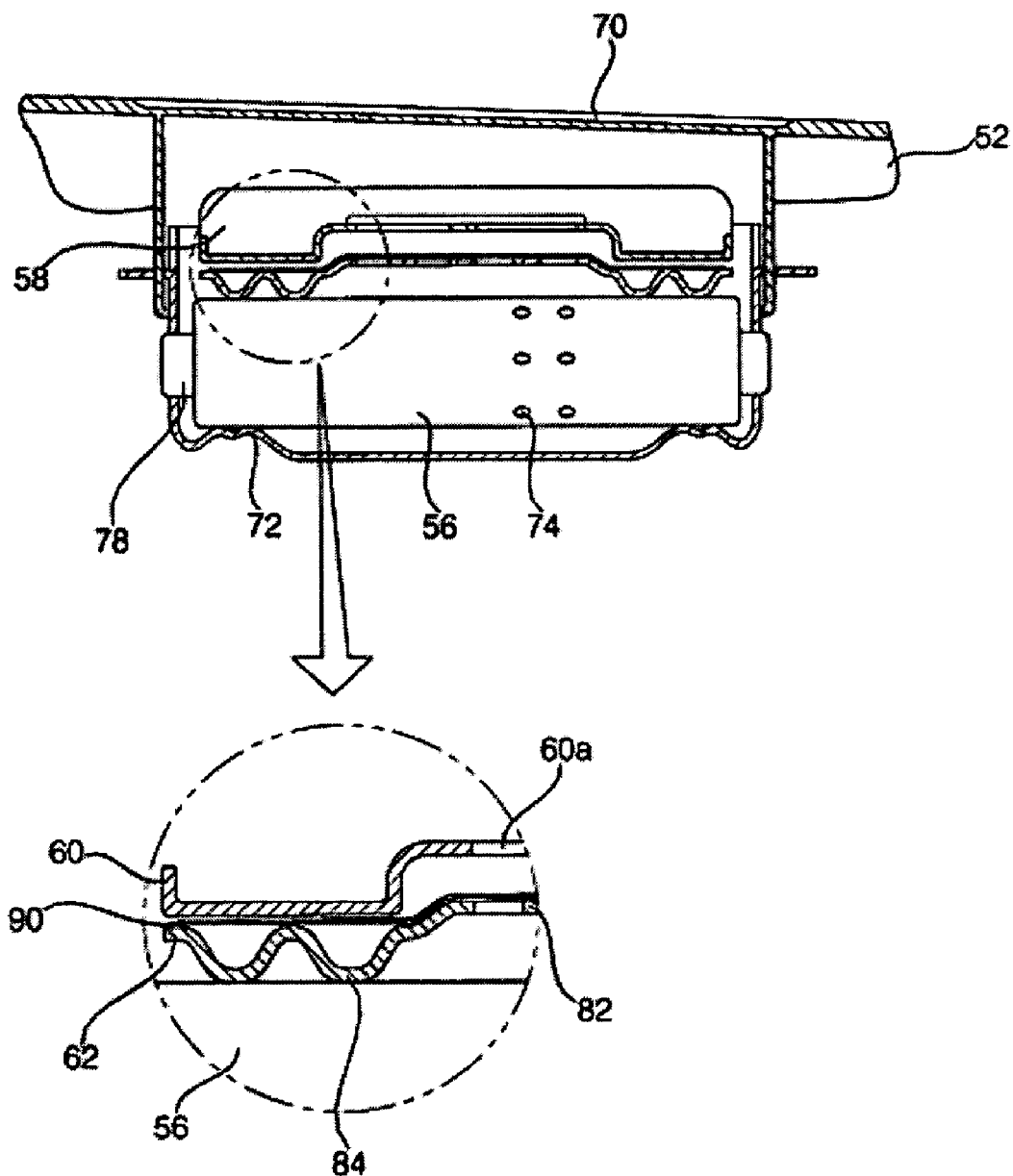
FIG. 5 is a front view, in section, showing the passenger air bag system according to the preferred embodiment of the present invention.

FIG. 3 is an exploded perspective view showing a passenger air bag system according to a preferred embodiment of the present invention, FIG. 4 is a side view, in section, showing the passenger air bag system according to the preferred embodiment of the present invention, and FIG. 5 is a front view, in section, showing the passenger air bag system according to the preferred embodiment of the present invention.

As shown in FIGS. 3 to 5, the passenger air bag system for vehicles according to the present invention comprises: an air bag housing 54 mounted to an air bag door 52; an inflator 56 disposed in the air bag housing 54 for discharging gas when a collision of the vehicle occurs; a cushion 58 accommodated in the air bag housing 54 such that the cushion 58 is disposed in front of the inflator 56, the cushion 58 being expanded by means of the gas discharged from the inflator 56; a retainer 60 attached to the air bag housing 54 such that the retainer 60 is disposed between the cushion 58 and the inflator 56 for supporting the cushion 58, the retainer 60 having a plurality of gas-guiding holes 60a for guiding the gas discharged from the inflator 56 to the cushion 58; and an inflator holder 62 disposed between the retainer 60 and the inflator 56, the inflator holder 62 being fixed to the air bag housing 54 together with the retainer 60 for securely holding the inflator 56 by means of a fixing force of the retainer 60.

The air bag housing 54 comprises: a cushion housing 64 formed in the shape of a box with the front part opened so that the cushion 58 is accommodated in the cushion housing 64 while being folded; and a can housing 66 connected to the rear part of the cushion housing 64, the can housing 66 being fixed to the outer circumference of a cowl cross member (not shown).

The cushion housing 64 is fixed to the rear part of the air bag door 52, which is attached to an instrument panel disposed in front of a passenger seat. At the rear part of the air bag door 52 is provided a housing fixing part 68, which is formed in the shape of a box. The cushion housing 64 is inserted into the housing fixing part 68 of the air bag door 52. At the front part of the air bag door 52 is formed a cut line 70, along which the air bag door 52 can be easily broken by means of the expansion pressure of the cushion 58. As a result, the cushion 58 can be rapidly expanded.

The cushion housing 64 is provided along both longitudinal sides thereof with a plurality of hooks 64a, respectively. Similarly, the housing fixing part 68 of the air bag door 52 is provided with hook holes 68a, which correspond to the hooks 64a of the cushion housing 64. The cushion housing 64 is securely fixed to the housing fixing part 68 of the air bag door 52 by means of engagement of the hooks 64a in the corresponding hook holes 68a.

In the case of the instrument panel not provided with the air bag door 52, the housing fixing part 68 is formed at the rear part of the instrument panel so that the cushion housing 64 can be directly fixed to the instrument panel.

The can housing 66 is connected to the rear part of the cushion housing 64 in such a manner that the can housing 66 communicates with the cushion housing 64. The can housing 66 is fixed to a cowl cross member (not shown) disposed in the instrument panel.

At both inner ends of the can housing 66 are formed inflator supporting parts 72, respectively, for securely supporting both ends of the inflator 56.

The inflator supporting parts 72 are formed such that the inner sides of the can housing 66 are concave towards the inflator 56, whereby the inflator 56 is tightly supported by means of the inflator supporting parts 72 at both ends of the inflator 56. In other words, each of the inflator supporting parts 72 is formed in the shape of a "U" so that the inflator 56 is moved downward and then horizontally placed on the inflator supporting parts 72. Each of the inflator supporting parts 72 has the same diameter as the inflator 56 so that vibration of the inflator 56 mounted in the can housing 66 is minimized.

The inflator 56 is formed in the shape of a cylinder. The inflator 56 is provided on the outer circumference at one side thereof with a plurality of gas-discharging holes 74 for discharging gas when a collision of the vehicle occurs.

At both ends of the inflator 56 are formed connector-connecting members 78, respectively, in such a manner that the connector-connecting members 78 are protruded outwardly. To the inflator 56 is connected a connector 76, by which the inflator 56 is linked to an external device, such as an electronic control unit (not shown) and a power supply terminal (not shown), through the connector-connecting members 78.

When a collision of the vehicle occurs, an operation signal is transmitted from the electronic control unit to the inflator 56 via the connecter 76. The inflator 56 is exploded by means of electric current supplied from the power supply terminal on the basis of the operation signal transmitted to the inflator 56 for discharging gas having more than a prescribed pressure through the gas-discharging holes 74.

At both ends of the can housing 66 are formed connector grooves 80, each of which is formed in the shape of a "U", for allowing the connector-connecting members 78 to be inserted through the connecter grooves 80 so that the inflator 56 having the connector-connecting members 78 formed at both ends thereof is inserted into the can housing 66. Consequently, the connector-connecting members 78 are moved vertically so that the connector-connecting members 78 are inserted into or separated from the connector grooves 80, respectively. At the same time, the connector-connecting members 78 are protruded out of the can housing 66.

The inflator holder 62 is formed with the same shape as the retainer 60 so that the inflator holder 62 can be closely placed on the retainer. At the center part of the inflator holder 62 are formed diffuser holes 82, through which the gas discharged from the inflator 56 passes.

The diffuser holes 82 are preferably formed in large numbers at the inflator holder 62 such that the diffuser holes 82 communicate with the gas-guiding holes 60*a* of the retainer 60.

At both ends of the inflator holder 62 are formed inflator pressing parts 84, which correspond to the inflator supporting parts 72. Each of the inflator pressing parts 84 has a plurality of semicircular prominent portions, which surround the outer circumference of the inflator 56 at each end of the inflator 56.

Specifically, each of the prominent portions of the inflator pressing parts 84 is bent in the shape of a circle, and protruded toward the inflator 56. Consequently, the inflator pressing parts 84 can be securely attached to the inflator 56 at both ends of the inflator 56.

At both sides of the inflator holder 62 are formed a plurality of fixing holes 85. Similarly, at both sides of the retainer 60 are formed a plurality of fixing holes 86. The inflator holder 62 and the retainer 60 are fixed to the can housing 66 by means of fixing members 88, which are fitted in the corresponding fixing holes 85 and 86. The inflator holder 62 is pressed against the inflator 56 by means of the fixing force of the retainer 60 through the fixing members 88. The inflator pressing part 84 is pressed by means of both ends of the retainer 60 so that the inflator pressing part 84 is tightly placed onto the outer circumference of the inflator 56 at both ends of the inflator 56.

Consequently, the inflator pressing part 84 is pressed against the inflator supporting parts 72 via the inflator 56 so that both ends of the inflator 56 are securely fixed.

Between the inflator holder 62 and the retainer 60 is further disposed a mesh plate 90, which is formed in the shape of a net. The gas flowing from the diffuser holes 82 of the inflator holder 62 to the gas-guiding holes 60*a* of the retainer 60 is filtered by means of the mesh plate 90 so that foreign substances are removed. Also, the cooling effect of the inflator holder 62 and the retainer 60 is improved by means of the mesh plate 90.

The mesh plate 90 is provided at both sides thereof with a plurality of fixing holes 87, which correspond to the fixing holes 85 of the inflator holder 62 and the fixing holes 86 of the retainer 60, so that the mesh plate 90 is fixed to the inflator holder 62 and the retainer 60 by means of the fixing members 88.

The cushion 58 is fixed to the air bag housing 54 together with the retainer 60 by means of the fixing members 88 such that the inlet part of the cushion 58 communicates with the gas-guiding holes 60*a* of the retainer 60. Consequently, the gas flowing through the gas-guiding holes 60*a* of the retainer 60 is introduced into the inlet part of the cushion 58 so that the cushion 58 is expanded. The separation of the expanding cushion 58 from the air bag housing 54 is prevented by means of the retainer 60.

The assembly operation of the passenger air bag system for vehicles with the above-stated construction according to the present invention will now be described in detail.

The can housing 66 is fixed to the rear part of the cushion housing so that the air bag housing 54 is formed. After the formation of the air bag housing 54 is completed, the inflator 56 is inserted into the can housing 66 from top to bottom such that the inflator 56 is closely placed on the inflator supporting parts 72 of the can housing 66.

The ends of the inflator 56 are closely placed on the inflator supporting parts 72 of the can housing 66 as the inflator 56 is moved downward. At this time, the connector-connecting members 78 of the inflator 56 are protruded outward from the can housing 66 through the connector grooves 60 formed at both ends of the can housing 66.

After the inflator 56 is horizontally placed on the inflator supporting parts 72, the inflator holder 62 is put on the inflator 56. Subsequently, the mesh plate 90 and the retainer 60 are put on the inflator holder 62 in turn.

The fixing holes 85, 86 and 87 formed at the inflator holder 62, the mesh plate 90, and the retainer 60, respectively, are arranged so that the fixing holes 85, 86 and 87 are disposed in lines, and then the fixing members 88 are inserted through the fixing holes 85 and 86 so that the inflator holder 62, the mesh plate 90, and the retainer 60 are simultaneously fixed to the can housing 66.

The retainer 60 is pressed against the inflator holder 62 by means of the fixing members 88, and the inflator pressing parts 84 of the inflator holder 62 are pressed against the inflator 56 at both ends of the inflator 56.

Consequently, the inflator pressing parts 84 and the inflator supporting parts 72 are pressed against the inflator 56 at both ends of the inflator 56 by means of a fixing force of the retainer 60, which does not require a fixing nut and a fixing surface of the can housing, which are used to fix the inflator 56 in the conventional air bag system.

Furthermore, the cushion 58 is accommodated in the cushion housing 64 while the cushion 58 is folded, and the inlet part of the cushion 58 is fixed to the retainer 60 by means of bolts. The connector 76 is connected to the protruded connector-connecting members 78 of the inflator 56 so that the inflator 56 is linked to the electronic control unit and the power supply terminal via the connector 76.

The passenger air bag system assembled as described above is mounted to the air bag door 52 and the cowl cross member. The plurality of hooks 64*a* formed at the longitudinal sides of the cushion housing 64 are engaged in the corresponding hook holes 68*a* formed at the rear part of the air bag door 52 so that the cushion housing 64 is attached to the air bag door 52. The can housing 66 is securely fixed to the cowl cross member by means of the mounting bracket (not shown).

As apparent from the above description, the present invention provides a passenger air bag system for vehicles wherein an inflator is securely fixed using an inflator holder pressed by an air bag housing and a retainer. Consequently, the assembly operation of the inflator can be easily performed, whereby working efficiency is improved, and an assembly process is simplified.

The present invention does not require a fixing nut, which is used to fix the inflator in the conventional air bag system. Consequently, record and torque control of the fixing nut is not necessary, and thus maintenance of the passenger air bag system can be easily and conveniently carried out with the result that the cost of maintenance is reduced.

The air bag housing of the present invention does not have a fixing surface, on which the fixing nut is placed, since the fixing nut is not used in the present invention. Consequently, the size of the air bag housing is reduced, and thus the compact design of the passenger air bag system is possible.

The inflator is fixed by means of inflator supporting parts of the air bag housing and inflator pressing parts of the inflator holder at both ends of the inflator. Consequently, the inflator is securely fixed as compared to an inflator of the conventional air bag system, which is only fixed by means of a fixing nut at one end of the inflator, and thus vibration of the inflator is effectively prevented.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A passenger air bag system for vehicles, comprising:
    an air bag housing;
    an inflator disposed in the air bag housing that discharges gas when a collision occurs;
    a cushion accommodated in the air bag housing such that the cushion is expanded by gas discharged from the inflator;
    a retainer disposed between the cushion and the inflator that supports the cushion, the retainer having a plurality of gas-guiding holes that guide the gas discharged from the inflator to the cushion; and
    an inflator holder disposed between the retainer and the inflator, the inflator holder being fixed to the air bag housing together with the retainer to securely hold the inflator by a fixing force of the retainer.

2. The system as set forth in claim 1, wherein the air bag housing has inflator supporting parts provided at inner ends thereof, to securely support ends of the inflator.

3. The system as set forth in claim 2, wherein each of the inflator supporting parts is generally U-shaped and has portions engaging the inflator so that the inflator is moved downward and then horizontally placed on the inflator supporting parts.

4. The system as set forth in claim 3, wherein the inflator supporting parts are provided such that inner sides of the air bag housing are concave towards the inflator, whereby the inflator is tightly supported by the inflator supporting parts at the ends of the inflator.

5. The system as set forth in claim 4, wherein each of the engaging portions of the inflator supporting parts has the same radius as the radius of the inflator.

6. The system as set forth in claim 5, wherein the inflator has connector-connecting members provided at the ends thereof, while the connector-connecting members are protruded outwardly so that the inflator is connected to an external device by a connector connected to the connector-connecting members.

7. The system as set forth in claim 6, wherein the air bag housing has connector grooves provided at ends thereof, each of the connector grooves are generally U-shaped to allow the connector-connecting members to be inserted through the connecter grooves so that the connector-connecting members provided at the ends of the inflator are protruded outward through the connector grooves.

8. The system as set forth in claim 7, wherein the inflator holder has inflator pressing parts provided at both ends thereof, to press the outer circumference of the inflator at the ends of the inflator, wherein the inflator pressing parts correspond to the inflator supporting parts.

9. The system as set forth in claim 8, wherein the retainer has a plurality of fixing holes provided at sides thereof, and the inflator holder has a plurality of fixing holes provided at sides thereof, wherein the fixing holes of the inflator holder correspond to the fixing holes of the retainer so that the retainer and the inflator holder are fixed to the air bag housing by fixing members fitted in the corresponding fixing holes of the retainer and the inflator holder.

10. The system as set forth in claim 9, wherein the inflator pressing part is pressed by the retainer as the fixing members are tightly fitted in the corresponding fixing holes of the retainer and the inflator holder so that the inflator pressing part is tightly placed onto the outer circumference of the inflator at the ends of the inflator.

11. The system as set forth in claim 10, wherein each of the inflator pressing parts has protruding portions extending toward the inflator.

12. The system as set forth in claim 11, wherein each of the protruding portions are provided in the shape of a circle.

13. The system as set forth in claim 12, wherein the portions of the respective inflator pressing parts comprise a plurality of portions.

14. The system as set forth in claim 13, wherein each of the inflator pressing parts has a semicircular section so that the inflator pressing parts surround the outer circumference of the inflator at the ends of the inflator.

15. The system as set forth in claim 14, wherein the inflator holder has diffuser holes provided at the center part thereof to allow the gas discharged from the inflator to pass therethrough.

16. The system as set forth in claim 15, wherein diffuser holes are arranged such that the diffuser holes communicate with the gas-guiding holes of the retainer.

17. The system as set forth in claim 16, further comprising a mesh plate disposed between the inflator holder and the retainer that perform filtering and cooling functions.

18. The system as set forth in claim 17, wherein the mesh plate is provided at the sides thereof with a plurality of fixing holes so that the mesh plate is fixed to the air bag housing together with the retainer and the inflator holder by the fixing members.

19. The system as set forth in claim 17, wherein the mesh plate has a contoured shape corresponding to the surface of the inflator.

* * * * *